INVENTOR.
Frank R. L. Daley, Jr.
BY D. D. McGraw
His Attorney

Dec. 22, 1964     F. R. L. DALEY, JR     3,162,018
SPLIT SYSTEM MASTER CYLINDER AND BRAKE BOOSTER
Filed Feb. 4, 1963                              4 Sheets-Sheet 2
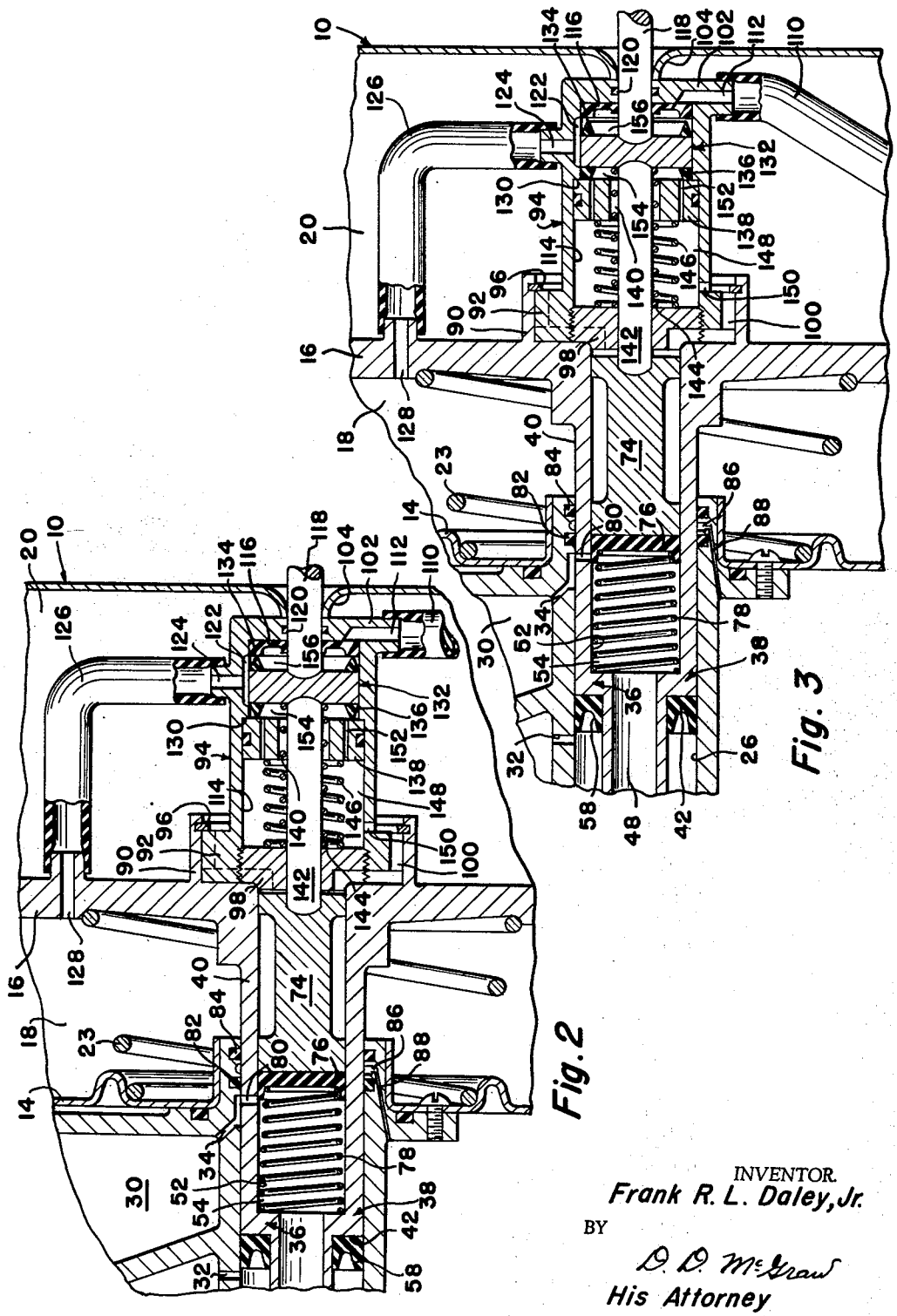
INVENTOR.
Frank R. L. Daley, Jr.
BY
D. D. McGraw
His Attorney

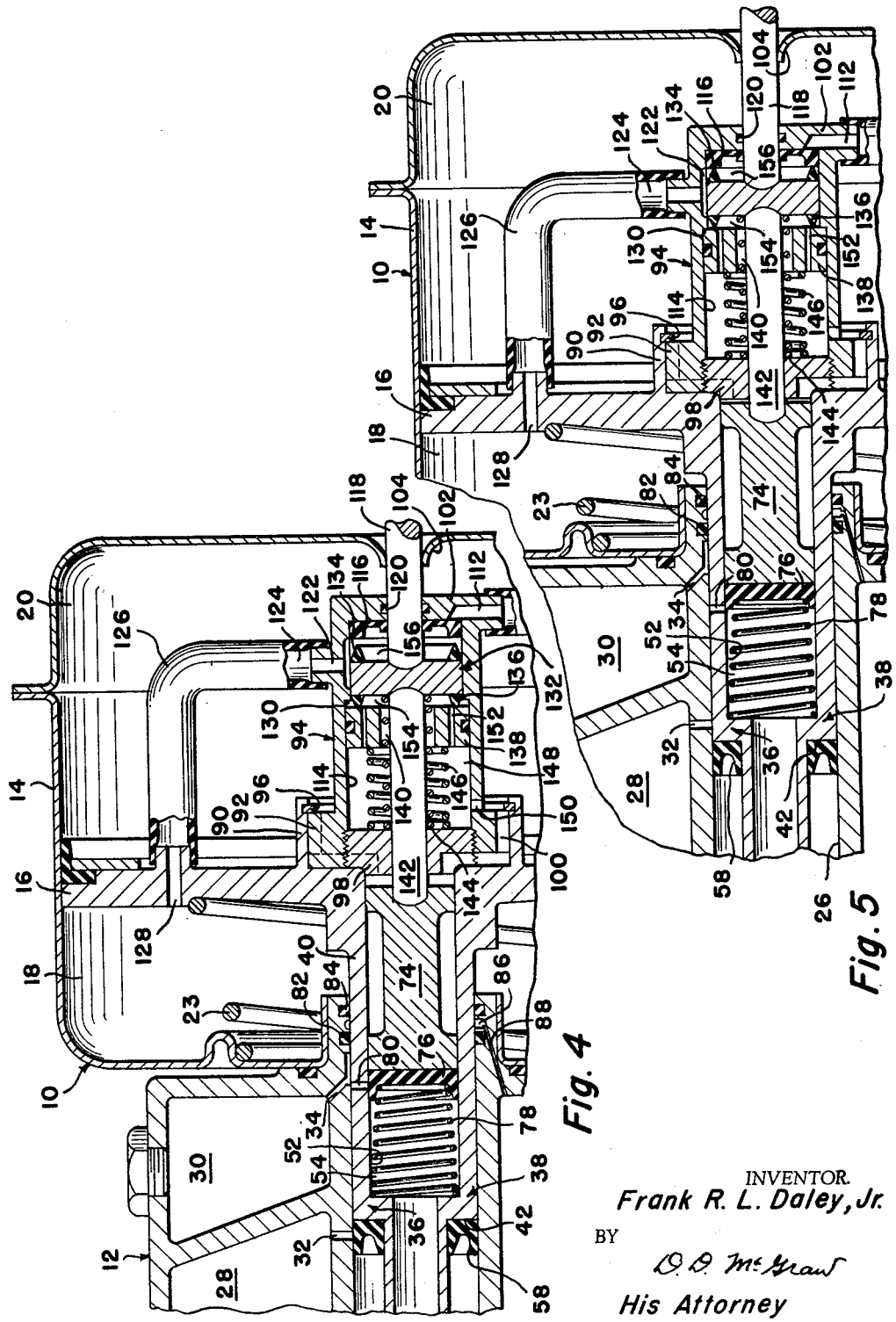

INVENTOR.
Frank R. L. Daley, Jr.
BY
D. D. McGraw
His Attorney

United States Patent Office 3,162,018
Patented Dec. 22, 1964

3,162,018
SPLIT SYSTEM MASTER CYLINDER AND
BRAKE BOOSTER
Frank R. L. Daley, Jr., Fenton, Mich., assignor to General Motors Corporation, Detroit, Mich., a corporation of Delaware
Filed Feb. 4, 1963, Ser. No. 255,862
10 Claims. (Cl. 60—54.6)

The invention relates to a power unit for a fluid pressurizing system, and more particularly to a power unit for an automotive hydraulic brake system. In order to decrease the manual force required to actuate vehicle brakes, it has been common practice to use a differential pressure actuated power booster which applies force to a master cylinder unit under manual control of the vehicle operator. It has also been common to provide separate fluid pressurizing chambers in the master cylinder unit for the front and rear brakes of such a vehicle. It is now proposed to provide a self-equalizing master cylinder which will equalize the front and rear brake line pressures at different levels by utilizing the differential in application rate between a power unit and a manual unit. A unit embodying the invention will provide substantially equal hydraulic line pressures upon initial application. The power portion of the unit will have a more rapid rate of increase of hydraulic line pressure with increase of application force so that when high power applications occur the biasing effect will favor the higher capabilities of the front brakes where the power application is used. This is desirable since the decelerating action of the vehicle transfers the braking capability from the rear to the front wheels in proportion to the transfer of effective weight thereon. In high deceleration situations the front wheels are capable of absorbing much greater energy without skidding than they are in lower deceleration situations because they are carrying a heavier effective weight. In previous systems the degree of front braking is compromised so that it is not excessive on low coefficients of friction surfaces and the low decelerations but results in somewhat less than maximum effectiveness in a high deceleration good road surface condition where the front wheels might be capable of absorbing substantial majority of the overall energy dissipated.

By controlling the differential biasing effect in application rate through the use of a manual section and a power section in the system, the differential levels of line pressures will favor higher capability of the front brakes when high deceleration stops occur.

Mechanism embodying the invention therefore utilizes a master cylinder having a pressurizing piston operated by a power wall and controlled by a valve system under manual control of the operator. Control of the valve system at the same time controls the manual application of force to a second pressurizing member in a second fluid pressurizing chamber in the master cylinder assembly. The power pressurized fluid is utilized in operating the vehicle front brakes and the manual pressurized fluid is utilized in operating the vehicle rear brakes. The system may also be operated so that a small part of the pressurizing force in the rear brake system is power applied. The mechanism also provides for rear brake application upon failure of the power system without requiring movement of inoperative parts of the power system or any action on the part of the vehicle operator other than continuing to apply force through the brake pedal. The system also provides a fluid reaction through the manual portion of the system which is indicative of the braking forces being applied to the vehicle brakes.

In the drawings:

FIGURE 2 is a section view of a portion of the mechanism of FIGURE 1, with parts broken away, and showing the power unit in the poised position just before power is applied.

FIGURE 3 is similar to FIGURE 2, and shows the power unit in position at the beginning of the power stroke.

FIGURE 4 is similar to FIGURE 2, and shows the power unit in the middle of the power stroke.

FIGURE 5 is similar to FIGURE 2, and shows the power unit in the hold position with the brakes applied.

Figure 1:
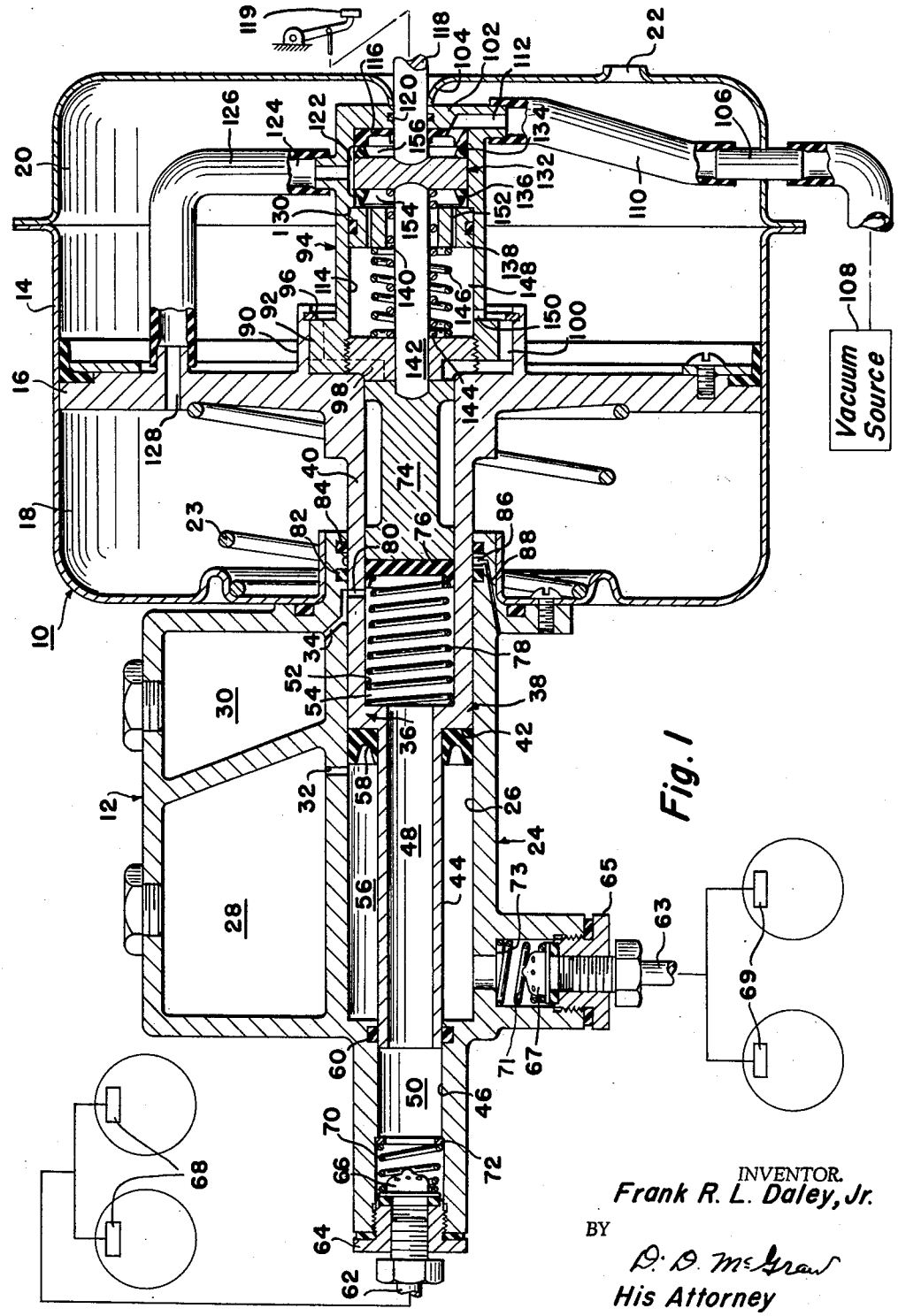
FIGURE 1 is a cross-section view of mechanism embodying the invention, with parts broken away and portions of the system being schematically illustrated. The system is shown in the brake released condition.

The mechanism embodying the invention includes a power booster section 10 and a master cylinder section 12. The power booster section has a housing 14 in which a power wall illustrated in this instance as a power piston 16 is operable. The power piston 16 divides the housing into differential pressure chambers. The system is illustrated as being utilized with a vacuum source, although it may be modified for use with a pressure source. The differential pressure chambers are therefore illustrated as vacuum chamber 18 and atmospheric chamber 20. An atmospheric vent 22 is suitably provided in a portion of housing 14 so that atmospheric pressure is always in chamber 20. A power piston return spring 23 is positioned in vacuum chamber 18 so that it engages the forward wall of housing 14 and the vacuum chamber wall of piston 16 and urges the power piston to the brake release position. This spring also acts as the return spring for the powered fluid displacement member of the master cylinder.

The master cylinder section is assembled to one end of the housing 14 and includes a cylinder body 24 in which the cylinder 26 is formed. A fluid reservoir chamber 28 is provided and may be a part of the cylinder body 24. Another fluid reservoir chamber 30 is similarly provided. Reservoir chamber 28 contains fluid which is associated with the front braking fluid system, while reservoir chamber 30 contains fluid which is associated with the rear brake system of an automotive vehicle. For this purpose, compensation port 32 connects chamber 28 with cylinder 26 at one point and compensation port 34 connects chamber 30 with the cylinder 26 at another point.

A master cylinder piston assembly 36 is operable in the master cylinder 26 and includes a first tubular fluid displacement member 38 which is attached to or formed as a part of power piston 16. Member 38 has the rear end 40 thereof constructed to reciprocate directly within cylinder 26. A shoulder 42 formed on member 38 defines the forward end of rear end 40 and a smaller diameter tubular extension 44 extends beyond shoulder 42 into a reduced diameter cylinder 46 formed from master cylinder body 24 at the forward end of cylinder 26. The inner passage 48 of tubular extension 44 is in fluid connection with the fluid pressurizing chamber 50 formed by the reduced diameter cylinder 46. A cylinder 52 is defined by the inner wall of the rear end 40 of fluid displacement member 38 so as to provide a fluid pressurizing chamber 54 therein which is in fluid connection with chamber 50 through passage 48. Thus the inner wall of cylinder 26 cooperates with the outer wall of tubular extension 44 and the shoulder 42 of member 38 to provide the annular fluid pressurizing chamber 56. An annular cup or seal member 58 is received about tubular extension 44 and abuts shoulder 42 so that in the released position it clears compensation port 32 as illustrated. A seal 60 provided in the cylinder body 24 intermediate chambers 50 and 56 engages the outer wall of tubular extension 44 at all times so as to separate these chambers. A fluid conduit 62 is connected through the adapter 64 and check valve 66 to chamber 50 at one end and distributes pressurized fluid from that chamber to the rear wheel brakes 68. A spring 70 received in one end of chamber 50 and acting against a spring retainer 72 controls the action of check valve 62. Fluid displacement chamber 56 is in fluid communication with conduit 63 through adapter 65 and check valve 67 to the front wheel brakes 69. Spring 71 reacts on check valve 67 and the shoulder 73 formed as a part of the master cylinder body 42. A second fluid displacement member 74 is reciprocably received in cylinder 52 and is in the general form of the usual master cylinder piston. It is provided with a cup or seal 76 at its forward end to seal the rear end of fluid pressurizing chamber 54. A piston return spring 78 abuts the inner portion of shoulder 42 forming a part of the end wall of chamber 54 and also engages the cup 76. In the brake released position cup 76 just clears the compensation passage 80 formed through the wall of fluid displacement member 38 so that in the brake released position and through a portion of the pressurizing movement of member 38 it is in fluid communication with compensation port 34. Spaced seals 82 and 84 are provided in the rear end of cylinder body 24 so that they engage the outer surface of fluid displacement member 38 and prevent leakage of any fluid between the master cylinder section and the power booster section. A groove 86 is provided in cylinder 26 intermediate seals 82 and 84 and a passage 88 connects groove 86 with the atmosphere so that vacuum in chamber 18 can at no time act on fluid in the master cylinder section, even should either of the seals 82 or 84 become damaged. This provides an important safety feature in that the vacuum chamber cannot empty the reservoir 30 and possibly the chamber 54 of fluid due to damaged seals.

The power piston 16 is provided with a rearwardly extending cylindrical section 90 in which the flanged end 92 of a valve cylinder 94 is received and held in position by snap ring 96. A plug 98 is threaded into cylinder flanged end 92 and has a small boss formed therein extending slightly into the rear end of cylinder 52 to provide a rear stop for the piston 74. An atmospheric vent passage 100 is provided to the rear of piston 74 by grooves formed in plug 98 and the cylinder flanged end 92 so that the vent passage connects with the atmospheric chamber 20. The rear wall 102 provided as a part of cylinder 94 engages a boss 104 suitably formed as a part of housing 14 to provide a rear stop for the power wall and the master piston assembly 36.

A conduit 106 extending through the housing 14 and into the atmospheric chamber 20 is connected at its outer end to a suitable differential pressure source 108 which is illustrated and described in the preferred embodiment as a source of vacuum. This may suitably be the intake manifold of the automobile engine, although other sources of differential pressure may be provided. Conduit 106 has its inner end fluid connected through a flexible tube 110 to a passage 112 formed in cylinder rear wall 102 and in fluid communication with the rear end of the bore 114 formed by cylinder 94. A vacuum valve seat and seal assembly 116 is inserted in the bore 114 and engages the rear wall 102. A manually actuated valve operating rod 118 is connected with brake pedal 119 and extends through boss 104, rear wall 102 and the seal 120 provided therein, and the seat member 116 so that it terminates inside bore 114. A recess in the inner wall of bore 114 adjacent seat 116 provides a control pressure output chamber 122. Chamber 122 is connected through a passage 124 and a flexible tube 126 to the passage 128 extending through the power piston 16 and in fluid communication with the vacuum chamber 18. Just forward of chamber 122, bore 114 is slightly enlarged to provide a shoulder 130. A lip valve assembly 132, which is generally formed as a short cylinder, is received in the rear end of bore 114 so that it is reciprocable in the area of chamber 122. The rear face of assembly 132 is provided with a resilient annular lip 134 which is engageable with the valve seat 116 and cooperates therewith to provide a vacuum valve. The assembly 132 is provided with a similar lip 136 on the other side from lip 134 which forms part of the air valve. A floating valve seat 138 is reciprocably received in the larger portion of bore 114 so that in its rearward movement it abuts shoulder 130. Its rear face is engageable with lip 136 to provide the valve seat for that lip. A center passage 140 is formed through seat 138 so that a force-transmitting member 142 extends freely therethrough with one end engaging the forward side of valve lip assembly 132 and the other end engaging the fluid displacement member 74. A passage is also provided through plug 98 to permit member 142 to extend therethrough. A valve assembly return spring 144 surrounds member 142 and has one end seating against the rear wall of plug 98 and its other end seating against the valve assembly 132. A spring of greater overall diameter extends between the rear wall of plug 98 and the forward wall of valve seat 138 to function as the valve seat spring 146. The chamber 148 intermediate plug 98 and seat 138 is connected by a passage 150 in cylinder 94 to the atmospheric chamber 20. Passages 152 may also be provided through seat 138 radially inward of the area of engagement of lip 136 with the valve seat so as to connect the valve air chamber 154 with chamber 148. Valve air chamber 154 is intermediate seat 138 and valve assembly 132 with its outer periphery being defined by the air valve of which lip 136 and seat 138 are parts. A similar valve vacuum chamber 156 is provided at the rear side of valve assembly 132 and passage 112 connects with this chamber.

The system is shown in FIGURE 1 in the inactive condition wherein the vehicle brakes are released. Vacuum from source 108 exists in chamber 156. Air at atmospheric pressure exists in chamber 20, passage 150, chamber 148, passage 152 and chamber 154. Since spring 144 is holding valve assembly 132 to the right, vacuum valve lip 134 tightly engages vacuum valve seat 116 and is slightly collapsed so that air valve lip 136 is disengaged from surface floating valve seat 138. Therefore chamber 122, passage 124, conduit 126, passage 128 and vacuum chamber 18 are at atmospheric pressure. The system is therefore air suspended in the release position. Power piston return spring 23 holds the power piston assembly to the right with the rear wall 102 in engagement with the stop 104. This also positions the master cylinder piston assembly to the right and the piston return spring 78 is holding piston 74 against the piston stop formed by plug 98. The fluid in the conduits 62 and 63 is at residual line pressure maintained by check valves 66 and 67 respectively. The fluid in the fluid pressurizing chamber 50, which includes passage 48 and chamber 54, is at atmospheric pressure, being vented through compensation passage 80 and port 34 to the reservoir 30. The fluid in pressurizing chamber 56 is also at atmospheric pressure, being vented through compensation port 32 to the reservoir 28.

When the vehicle operator moves the brake pedal 119 to apply the brakes, he manually moves the valve operating rod 118 to the left. The first increment of movement engages air valve lip 136 with the floating valve seat 138. The flexibility of vacuum valve lip 134 permits this movement while maintaining that lip in sealing contact with seat 116. This is the poised position of the valve assembly illustrated in FIGURE 2.

Slight additional movement of the valve operating rod 118 to the left opens the vacuum valve by lifting lip 134 from seat 116 and vacuum is communicated to vacuum chamber 18 as illustrated in FIGURE 3. The differential pressure applied to the opposite walls of power piston 16 overcomes the power piston return spring 23 and moves the power piston to the left. Since the power master cylinder piston 38 is attached to piston 16, it also moves to the left.

Continued movement of valve operating rod 118 permits continued application of vacuum to chamber 18 and continued brake applying movement of the power piston 16 as shown in FIGURE 4. At the same time, the leftward movement of the valve assembly 132 acting on the floating valve seat 138 tends to slightly compress the valve lip 136. This slight movement is transmitted from rod 118 through valve assembly 132 and member 142 so that it disengages piston 74 from the plug 98 and results in manual force being transmitted to the fluid in chamber 54. The pressurizing action of pistons 38 and 74 continue and brake applying pressure is created in passage 48 and chambers 50, 54 and 56. The power movement of tube 44 into chamber 50 also gives a partial power application of pressure to the fluid in that chamber due to the decrease in chamber volume created by the leftward movement of the end of tube 44 into the chamber. The continued movement of the valve operating rod 118 will cause the floating valve seat 138 to move away from the shoulder 130 against the force of the valve seat spring 146 and at the same time the atmospheric pressure existing in chamber 154 is sealed from chamber 122.

The pressure acting in chamber 54 on the cup 76 is transmitted through the piston 74 and the force-transmitting member 142, through the valve assembly 132, to the valve operating rod 118. Since this is connected to the brake pedal 119 being moved by the vehicle operator, this force is felt as a brake reaction. When the brakes are applied to the desired extent, power piston 16, together with cylinder 94, moves to the left under influence of the differential pressure across the piston until the valve assembly again reaches the poised position as illustrated in FIGURE 5. At this time no additional vacuum is applied to chamber 18 since the vacuum valve is closed. Also no air is permitted to enter chamber 18 since the air valve assembly remains closed. The assembly therefore is in the hold position, with the vehicle operator feeling the reaction force transmitted from chamber 54. Since port 80 has moved beyond port 34, pressure is maintained in chamber 54.

When the brakes are released, the valve operating rod 118 moves to the right, removing the air valve lip 136 from the seat 138. This is immediately accomplished since the seat has moved rearwardly under influence of its spring 146 and the valve assembly 132 has moved rearwardly under the influence of its return spring 144 upon assumption of the hold position as shown in FIGURE 5. Atmospheric air is then communicated to vacuum chamber 18 and the power piston 16 moves to the right under the influence of return spring 23. If the brake has been completely released, the entire mechanism will move back to the position shown in FIGURE 1. If it has been only partially released, the lower piston 16 will move to the right until the poised position of the valve is once again reached. The system will then be held in this position until further movement of the valve operating rod 118 takes place. It can thus be seen that the front brakes 69 are pressurized entirely by power exerted through the power piston under control of the valve assembly 132 and that the rear brakes are pressurized primarily by movement of piston 74 and to some extent by power movement of tube 44, with the movement of piston 74 having been accomplished through manual movement. The line pressure levels in the front and rear brake systems will be equalized at different levels, with the front brake line pressure increasing at a higher rate than the rear brake line pressure as determined by the effective area of the cylinders and pistons in the hydraulic systems and in the power system.

Figure 6:
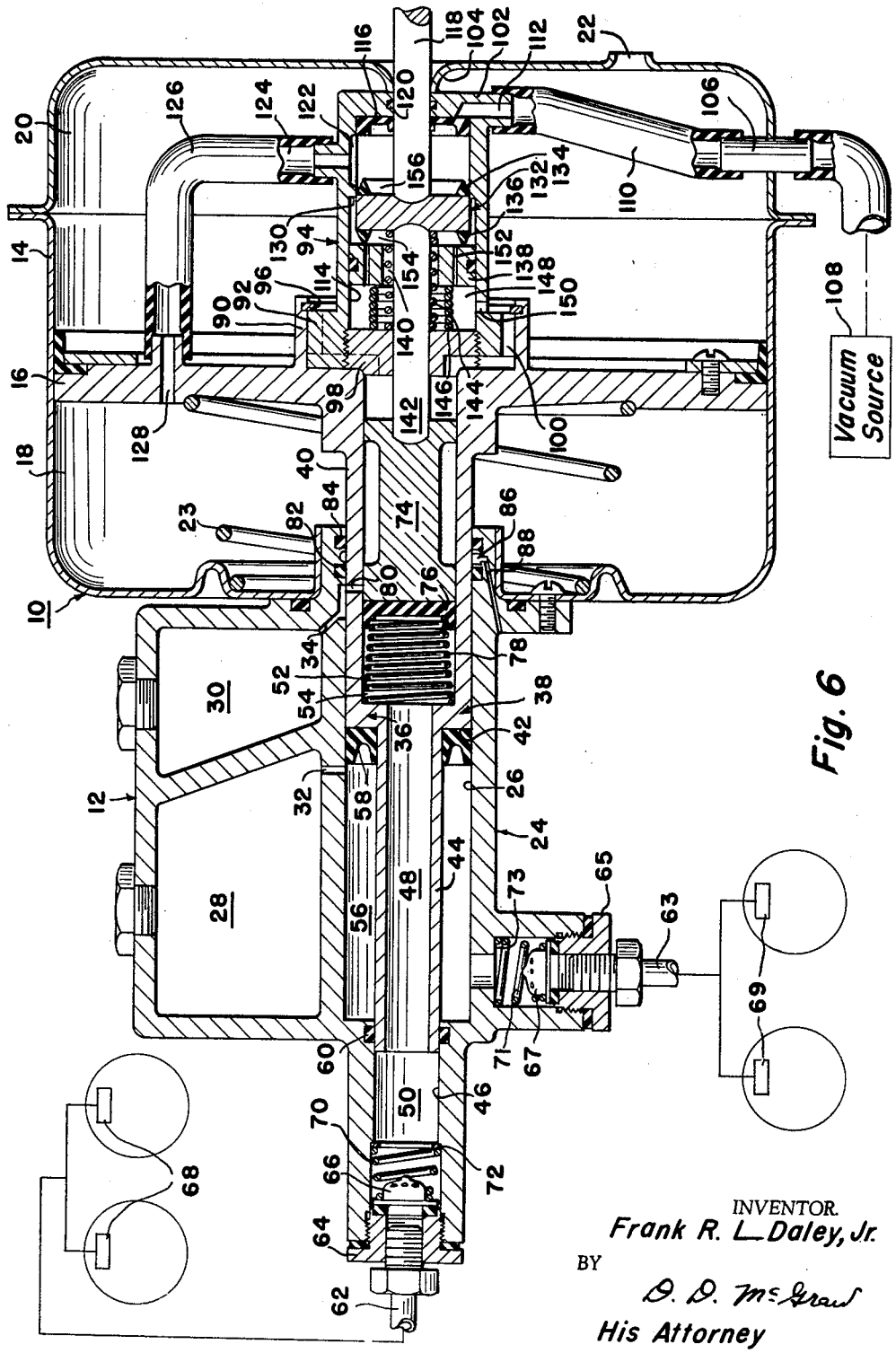
FIGURE 6 is similar to FIGURE 1, and shows the power unit in the manual apply position when no power is available.

FIGURE 6 illustrates operation of the brake unit when there is no power aavailable from the vacuum source 108. Under this condition, when the brakes are applied, although source 108 is connected with vacuum chamber 18 through chamber 156, chamber 122, and tube 126, there is insufficient differential pressure acting on power piston 16 to move that piston against the force of spring 23. There is therefore no power movement obtained of the fluid displacement member 38. Movement of valve operating rod 118 by the operator therefore transmits a brake applying force which is manually generated. This force is transmitted from rod 118 through valve assembly 132 and force-transmitting member 142 to master cylinder piston 74 and moves that piston in cylinder 52 to pressurize fluid in chamber 54, passage 48, and chamber 50. This pressurized fluid actuates the rear wheel brakes 68. It can be seen that no movement of power piston 16 is required in order to actuate the rear brakes manually. In some installations it may be desirable to provide for actuation of the front brakes manually even though the operator must move the power piston 16 in doing so. This can be arranged by providing for a solid stack up of elements so that further movement of valve operating rod 118 will move the fluid displacement member 38 to apply pressure to the front brakes 69. This can be accomplished through permitting spring 54 to become solid by compression, or providing a suitable shoulder in the cylinder against which the rear flange of piston 74 may be engaged, for example. Due to the established reliability of power sources, however, it is necessary in most vehicles to provide for emergency actuation of only the rear brakes under manual power.

I claim:

1. In a power unit for an automotive hydraulic brake: a master cylinder having first and second fluid pressurizing chambers; a pressure differential operated motor comprising, a cylinder having a power wall therein, said power wall having a valve chamber formed therein and a first valve seat in one chamber end and a second valve seat reciprocably operable in said chamber, valve means reciprocably disposed in said chamber intermediate said valve seats and cooperating with one of said valve seats for connecting one side of said power wall with a source of the lower of two differential pressures in one operating condition and cooperating with the other of said valve seats for connecting said one power wall side with a source of the higher of two differential pressures in a second operating condition and seating on both of said valve seats in a third operating condition, a manually effective valve actuator slidable in said power wall and extending into said chamber in force-transmitting engagement with said valve means; a tubular piston extending from said power wall into said master cylinder and having a reduced diameter tubular extension extending through said first fluid pressurizing chamber and into said second fluid pressurizing chamber and actively effective on fluid in said master cylinder fluid pressure chambers; a central piston operable in said tubular piston and actively effective on fluid in said tubular piston in fluid connection with said second fluid pressuring chamber; and actuating means operatively connected with said central piston and extending through said second valve seat into force-transmitting engagement with said valve means, said actuating means being manually effective through said valve actuator and said valve means to move said central piston in said tubular piston to pressurize fluid in said second fluid pressurizing chamber and to transmit a fluid reaction force from said second fluid pressurizing chamber to said manually effective valve actuator.

2. A pressure differential operated motor comprising, a cylinder having a power wall therein, a chamber formed in said power wall, a first valve seat in one valve chamber end and a second valve seat reciprocably received in said valve chamber, a stop for said second valve seat formed in said valve chamber, valve means reciprocably disposed in said valve chamber adjacent said stop and intermediate said valve seats and movable to engage only said first valve seat in one operating condition and only said second valve seat in a second operating condition and both of said valve seats in a third operating condition, a first output piston extending from said power wall and having a cylinder formed therein, a second output piston reciprocably received in said output piston cylinder and movable with said first output piston, a manually effective operating member engaging said valve means for manual movement thereof to control the admission and release of differential pressures to one side of said power wall, a force-transmitting member connecting said valve means and said second output piston for moving said second output piston in said first output cylinder in accordance with movement of said valve means, said second output piston being manually movable by said manually effective operating member and said valve means and said force-transmitting member to pressurize fluid upon failure of said power wall to operate and further providing a fluid pressurizing reaction to said manually effective operating member when fluid is pressurized in said output piston cylinder.

3. A power unit for an automotive brake comprising, a power wall, valve means for controlling said power wall, a first fluid pressurizing piston for pressurizing fluid in response to movement of said power wall, a second fluid pressurizing piston for pressurizing fluid, manually effective actuating means for moving said valve means to control said power wall, force transfer means transferring forces between said second fluid pressurizing piston and said valve means including force responsive to fluid pressurization to deliver a reaction force to said manually effective actuating means through said valve means from said second fluid pressurizing piston whenever fluid is pressurized, said manually effective actuating means and said valve means and said force transfer means further acting to move said second fluid pressurizing piston to pressurize fluid manually.

4. A valve system having first and second differential pressure inputs and a controlled pressure output, said valve system comprising, a cylinder having a valve lip assembly with oppositely disposed valve lips thereon, a floating valve seat reciprocably received in said cylinder, a stationary valve seat in said cylinder on the opposite side of said valve lip assembly from said floating valve seat, force exerting means urging said floating valve seat toward said valve lip assembly, a stop in said cylinder for said floating valve seat, first passage means for admitting said first differential pressure input to said floating valve seat for control by said valve lip assembly, second passage means for admitting said second differential pressure input to said stationary valve seat for control by said valve lip assembly, third passage means for receiving said controlled pressure output from said valve lip assembly and said valve seats, and manually effective valve lip assembly operating means for moving said valve lip assembly in differential pressure controlling action and to provide a manual output independent of the valve controlling action thereof by moving said valve lip assembly into engagement with said floating valve seat and continuing movement of said valve lip assembly against said force exerting means.

5. The mechanism of claim 4, said floating valve seat having passage means therethrough for equalizing fluid pressure on both sides thereof and providing at least a portion of said first passage means.

6. A brake unit for an automotive vehicle hydraulic brake comprising, a master cylinder having a first fluid pressurizing chamber and a second fluid pressurizing chamber, a first fluid displacement member having an inner passage extending axially therethrough, said first fluid displacement member being operable in said master cylinder and having a tubular piston section operable in said first fluid pressurizing chamber and a tubular extension section extending from and having a smaller outer diameter than said tubular piston section and extending through said first fluid pressurizing chamber and operable in said second fluid pressurizing chamber with the inner passage of said fluid displacement member communicating with and forming a part of said second fluid pressurizing chamber, a second fluid displacement member operable in the inner passage of said tubular piston section, a power unit having a movable wall connected with said first fluid displacement member, valve means in said movable wall for controlling the application of differential pressures to opposite sides of said movable wall, a manually effective valve actuating means, and a force-transmitting member intermediate said valve means and said second fluid displacement member for transmitting forces directly between said second fluid displacement member and said manually effective valve actuating means.

7. The brake unit of claim 6, said tubular piston section having a stop for said second fluid displacement member in the power wall end thereof, and spring means acting against said second fluid displacement member urging the same toward said stop, said second fluid displacing member being manually operable to pressurize fluid in said second fluid displacement chamber to operate the rear brakes of the automotive vehicle and said tubular piston section being power operable to pressurize fluid in said first fluid pressurizing chamber to operate the front brakes of the automotive vehicle whereby the pressures in said pressurizing chambers are equalized at different levels.

8. A brake system for an automotive vehicle having front wheel brakes and rear wheel brakes, said system comprising a master cylinder having first and second concentric fluid displacement members therein respectively active in first and second fluid pressure master cylinder chambers, said first fluid pressure chamber being fluid connected to said front wheel brakes and said second fluid pressure chamber being fluid connected to said rear wheel brakes, power means for operating said first fluid displacement member at one fluid pressurizing level increasing at a first rate, and manual means for operating said second fluid displacement member at a second fluid pressurizing level increasing at a second rate lower than said first rate.

9. The system of claim 8, said first fluid displacement member having an extension passing through said first fluid pressurizing chamber and into said second fluid pressurizing chamber and operable therein to provide a partial power fluid pressure in said second fluid pressurizing chamber.

10. The system of claim 8, said second fluid displacement chamber receiving hydraulic reaction force from the fluid pressure in said second chamber and transmitting the same to said manual means.

References Cited in the file of this patent

UNITED STATES PATENTS

| 2,042,392 | Dewandre | May 26, 1936 |
| 2,410,269 | Chouings | Oct. 29, 1946 |
| 2,887,848 | Rike | May 26, 1959 |
| 3,109,282 | Price | Nov. 5, 1963 |
| 3,109,287 | Gardner | Nov. 5, 1963 |